June 18, 1963  S. L. FLUGGE ETAL  3,094,396
METHOD OF AND APPARATUS FOR CURING INTERNAL
COATINGS ON CAN BODIES
Filed July 7, 1959  4 Sheets-Sheet 1

INVENTORS
SYLVESTER L. FLUGGE
ERNEST GLASER
BY Mason, Porter, Diller & Stewart
ATTORNEYS

United States Patent Office 3,094,396
Patented June 18, 1963

3,094,396
METHOD OF AND APPARATUS FOR CURING INTERNAL COATINGS ON CAN BODIES
Sylvester L. Flugge, Oak Park, and Ernest Glaser, Chicago, Ill., assignors to Continental Can Company, Inc., New York, N.Y., a corporation of New York
Filed July 7, 1959, Ser. No. 825,577
20 Claims. (Cl. 34—13)

This invention relates generally to the curing of wet, freshly applied enamel or lacquer that is normally applied to the inside of a metal container, and more particularly seeks to provide a novel method of and apparatus for rapidly curing such coating.

It is well known in the art of can making that the inside of a metal can body must usually have a lining of enamel or lacquer to protect the can from the product, or to protect the product from the chemical influence of the metal can. For example, cherries, when packed in a tin can, will bleach or fade unless the can is lined with a specially prepared enamel. Other canned products, such as spinach, are so highly corrosive that the can will deteriorate rapidly unless the can is lined with specially prepared enamel.

Until the present invention, the commercially accepted method of curing enamels or lacquers that had previously been applied to a can body, was by baking in a hot oven. During the hot air baking process, the enamel lined can body is subjected to hot air at a temperature ranging from 350 degrees to 420 degrees F., for a period of about twelve minutes. During the baking of the can bodies, the solvents that are necessary to carry or hold the enamel resins are driven off, leaving the resins bonded by means of fusion or polymerization to the can body. The solvents that are driven off vary with the resins being used. The principal resins used to coat can bodies are oil soluble resins, phenolic resins, vinyl resins and poxylene resins. The solvents necessary to hold or carry the resins in suspension are the naphthas, toluol, ketones, alcohols, isophorone and Cellosolves.

It will be readily apparent that the curing period involved in the hot air baking method coupled with the 600-can-per-minute speed of the modern can making plant requires lengthy, bulky and expensive baking ovens. These, of course, are undesirable, but are necessary under the present commercially accepted method of curing can bodies.

In view of the foregoing, it is the primary object of this invention to speed up the curing time of can making enamels and lacquers by providing a revolving gas burner shaped to fit into a can body and allowing gas flames ejected from the revolving gas burner to be disposed in close proximity to the enamaled surface of the can body wherein the enamel reaches its curing temperature very quickly and is cured in about six seconds or less.

In the present commercilly accepted method of curing can bodies, the solvents of the enamel or lacquer are merely driven out of the enamel or lacquer and then leave the baking oven through exhaust ducts to pollute the neighboring community. In view of this, it is another object of the invention to provide a novel method of curing can bodies wherein flame is applied directly to the interior of the can bodies with the solvents of the enamel and lacquer being driven off and completely burned in a short time during the curing operation.

Another object of the invention is to provide a novel method of curing and cooling can bodies which includes the steps of applying a flame to the interior of the can body to quickly cure the enamel, and immediately thereafter applying cooling air to the interior of the can body to cool the can body and complete the curing operation.

Still another object of the invention is to provide an apparatus for flame curing the interior coatings of can bodies, the apparatus including a rotating burner which is telescoped into the interior of a can body and which has a flame disposed in close proximity to the coating of the can bodies so that the coating is quickly cured at a high temperature, the apparatus being automatic in operation so as to continuously cure can bodies on an assembly line basis.

A further object of the invention is to provide a novel burner structure for use in a can curing operation through a flame curing method, the burner being provided with means for selectively supplying a source of fuel and a source of fresh air so that the burner may be utilized first for the flame curing of a can body, after which the same burner is utilized to apply cooling air to the can body to complete the curing operation.

A still further object of the invention is to provide a novel apparatus for flame curing can bodies, the apparatus including a rotating burner, means for telescoping the burner with respect to a can body, and means for igniting the burner only after the burner and can body are in telescoped relation so that the curing of the can body will be even throughout.

The temperature of a gas flame is upwards of 1,500 degrees F. This high flame temperature may be used to rapidly raise the temperature of a can body above the melting temperature of tin, thus making it very difficult to further handle the can body with the tin coating in such a molten state. Further, and of even greater concern, is the fact that a dull oxide forms on the outer surface of the can if the tin remains in a molten state and subject to the atmosphere for more than a few seconds. In view of this, it is a further object of the invention to provide an apparatus which is of a nature wherein the time of flame curing may be accurately controlled, and immediately after the flame curing operation, the can body may be cooled to prevent the undesirable oxidation of the tin.

Although the can bodies are usually heated to a temperature above the melting point of tin, the can bodies are not necessarily heated above the melting temperature of tin, in every case. For instance, when lithographed can bodies are cured, it is desirable to keep the temperature of the can body below the deterioration temperature of the lithograph, which may be below the melting temperature of tin. This can be accomplished by providing for a shorter burning time and using a coating which will cure rapidly at a lower temperature, or, by using a longer curing time with a burner having a lower heat output. Accordingly, it is another object of the invention to provide an apparatus for flame curing the interior coatings on can bodies, the apparatus being readily adaptable to can bodies of different types by varying the length of cams controlling the flow of fuel to the burners.

A still further object of the invention is to provide a novel blurner for the flame curing of the interior coating of a can body, the burner being mounted for rotation on a rotating union and being provided with separate sources of air and fuel, the burner being divided into separate chambers for receiving the air and fuel so that the burner may first flame cure the coating on a can body, and then immediately thereafter cool the can body very rapidly.

With the above, and other objects in view that will hereinafter appear, the nature of the invention will be more clearly understood by reference to the following detailed description, the appended claims, and the several views illustrated in the accompanying drawings.

Figure 1:
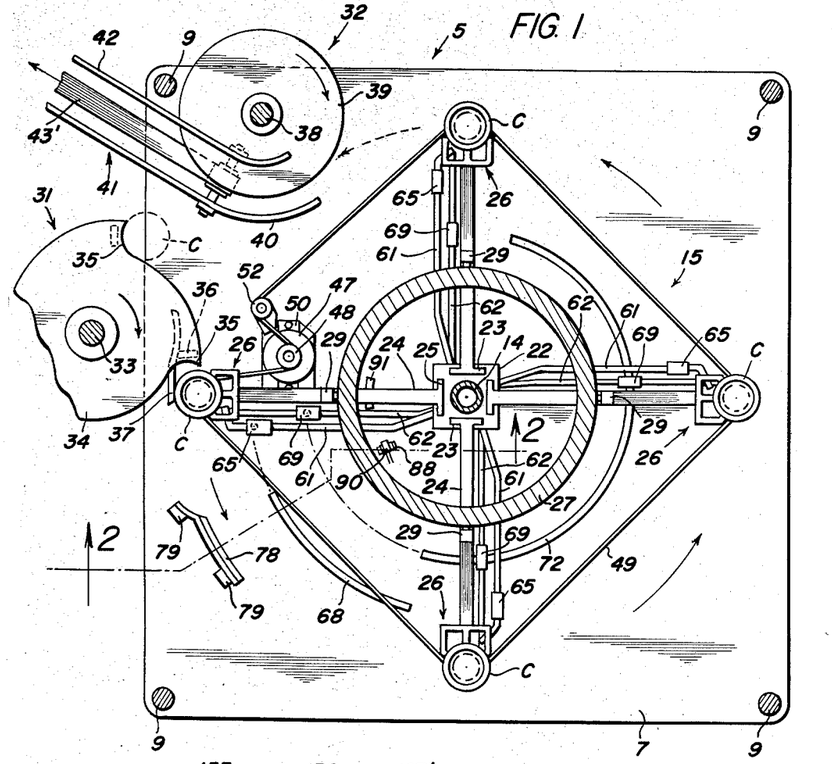
FIGURE 1 is a horizontal sectional view of the flame curing machine, which is the subject of the invention, taken along line 1—1 of FIGURE 2 and shows the general arrangement of the components thereof, the top plate of the frame and the drive means for the machine being omitted for purposes of clarity.
Figure 2:
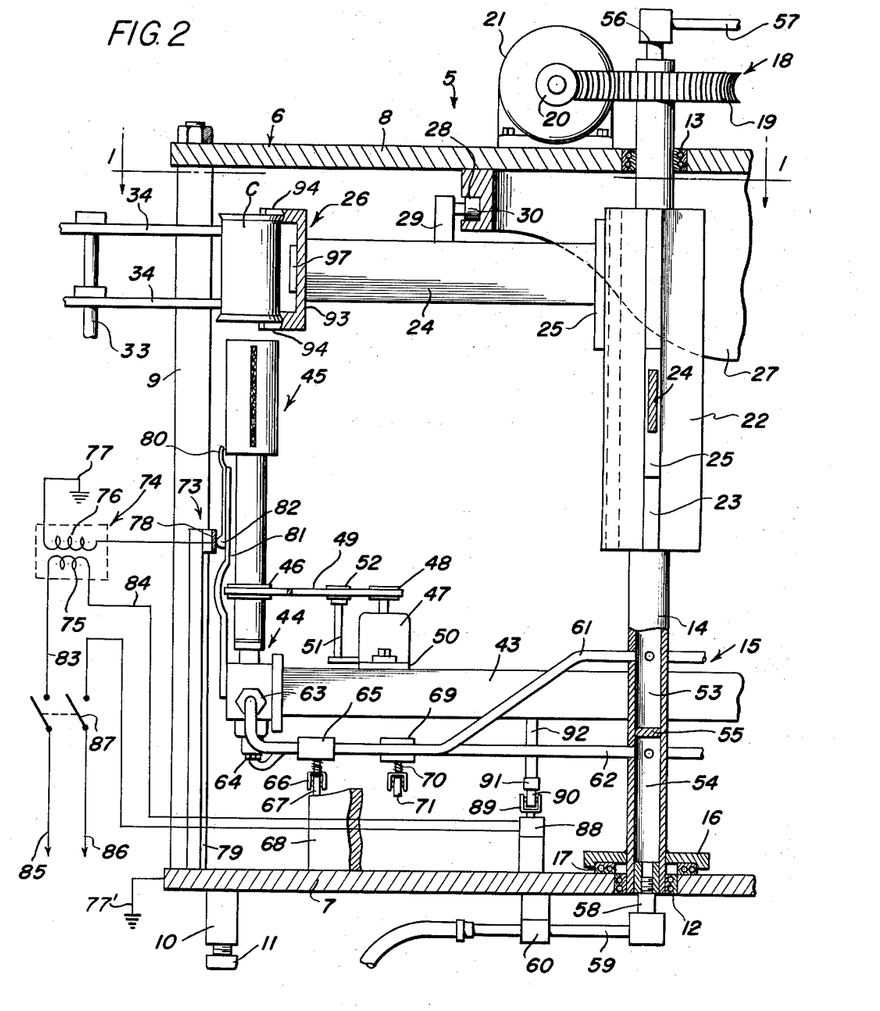
FIGURE 2 is an enlarged fragmentary vertical sectional view, taken along the plane indicated by the section line 2—2 of FIGURE 1, and shows further the specific details of the flame curing machine.

Reference is now had to the drawings, wherein the details of an embodiment of the flame curing machine in accordance with the invention are best illustrated in FIGURES 1 and 2, the flame curing machine being generally referred to by the numeral 5. The flame curing machine 5 includes a supporting frame, generally referred to by the numeral 6. The supporting frame 6 is simply illustrated as including a base plate 7, a top plate 8, the plates 7 and 8 being connected together at the corners thereof by combination spacers and ties 9. Suitable supporting legs 10 are secured to the underside of the base plate 7 and depend therefrom in supporting relation. If desired, the supporting legs 10 may be provided with adjustable feet 11 to facilitate the leveling of the machine 5.

The base plate 7 and the top plate 8 are provided with vertically aligned bearings 12 and 13, respectively, in which a tubular shaft 14 of a turret, generally referred to by the numeral 15, is rotatably journaled. The weight of the turret 15 is primarily distributed to the base plate 7 through a thrust collar 16 and a thrust bearing 17.

The turret 15 is rotated within the frame 6 through a drive mechanism generally referred to by the numeral 18. The drive mechanism 18 includes an extension of the shaft 14 which projects above the top plate 8 and on which a drive gear 19 is mounted. The drive gear 19 is meshed with a worm gear 20 of a drive unit 21. The drive unit 21 may be in the form of an electric motor and reduction gear unit, although other types of drive units may suffice for the intended purpose.

The upper portion of the shaft 14 below the top plate 8 is provided with an enlarged head 22. The head 22 is provided with a number of sides equal to the number of stations of the turret, there being four stations illustrated. Each of the sides of the head 22 is provided with a T-shaped guideway 23 which extends vertically throughout the length of the head 22. A support arm 24 extends from each side of the head 22 and is provided at its inner end with an enlarged T-shaped follower 25 which is slidably disposed in its associated T-shaped guide 23. The length and cross-sectional proportions of the individual followers 25 is such that pivoting of the respective support arm 24 with respect to the head 22 is prevented. A can holder, generally referred to by the numeral 26, is supported at the outer end of each of the support arms 24.

In order to effect the vertical reciprocatory movement of the individual support arms 24 and the can holders 26 carried thereby, there is provided a cam member 27 which is secured to the underside of the top plate 8. The cam member 27 is circular in cross-section, as is best illustrated in FIGURE 1, and is provided in the outer vertical wall thereof with a cam track 28 which undulates vertically. Each of the support arms 24 has an upstanding support 29 secured to the midportion thereof, the support 29, in turn, supporting a cam follower 30 which is positioned within the cam track 28 to raise and lower the respective support arm 24 as the turret 15 rotates.

Referring now to FIGURE 1 in particular, it will be seen that the flame curing machine 5 also includes an infeed turret, generally referred to by the numeral 31, and an outfeed turret, generally referred to by the numeral 32. The infeed turret 31 is illustratively shown as including a rotating shaft 33 on which a pair of plates 34 are mounted in vertically spaced relation. The plates 34 are provided with a plurality of aligned circumferentially spaced pockets 35 into which a can, such as the can C, is seated. Each of the cans C is retained in its respective pocket 35 by a magnet 36. The cans C are supplied to the infeed turret 31 from a suitable supply source (not shown), and are rotated in a clockwise direction. A stripper plate 37 is disposed intermediate the plates 34 and is aligned with the pockets 35 to strip the cans C from the pockets 35 as the infeed turret 31 rotates in timed relation with the turret 15.

The outfeed turret 32 is illustratively shown as including a vertical shaft 38 which is suitably journaled for rotation and is driven. The shaft 38 supports a turntable 39 on which the flame cured cans C are seated. A stripper member 40 is associated with the turntable 39 for stripping a flame cured can C from one of the can holders 26 as the turret 15 rotates past the outfeed turret 32. The stripper member 40 is a part of a guideway, generally referred to by the numeral 41, which includes a second guide 42 which is associated with the stripper member 40. A discharge conveyor belt 43' extends along the center of the guideway 41 and receives flame cured can bodies C from the turntable 39.

The turret 15 also includes a second set of support arms 43 which are secured to the lower portion of the shaft 14 in radiating relation. There is one support arm 43 for each of the support arms 24, and the support arms 24 and 43 are vertically aligned. The support arms 43 are rigidly secured to the shaft 14 for rotation therewith and are so vertically fixed. A rotating union, generally referred to by the numeral 44 is secured to the outer part of each of the support arms 43 and extends in a vertical direction. The general details of the rotating union 44 will be described hereinafter. Each rotating union 44 supports for rotation a burner, generally referred to by the numeral 45. The construction of the individual burner 45 may vary, and the details of several suitable burners will be described hereinafter.

Figures 3, 4, 9:
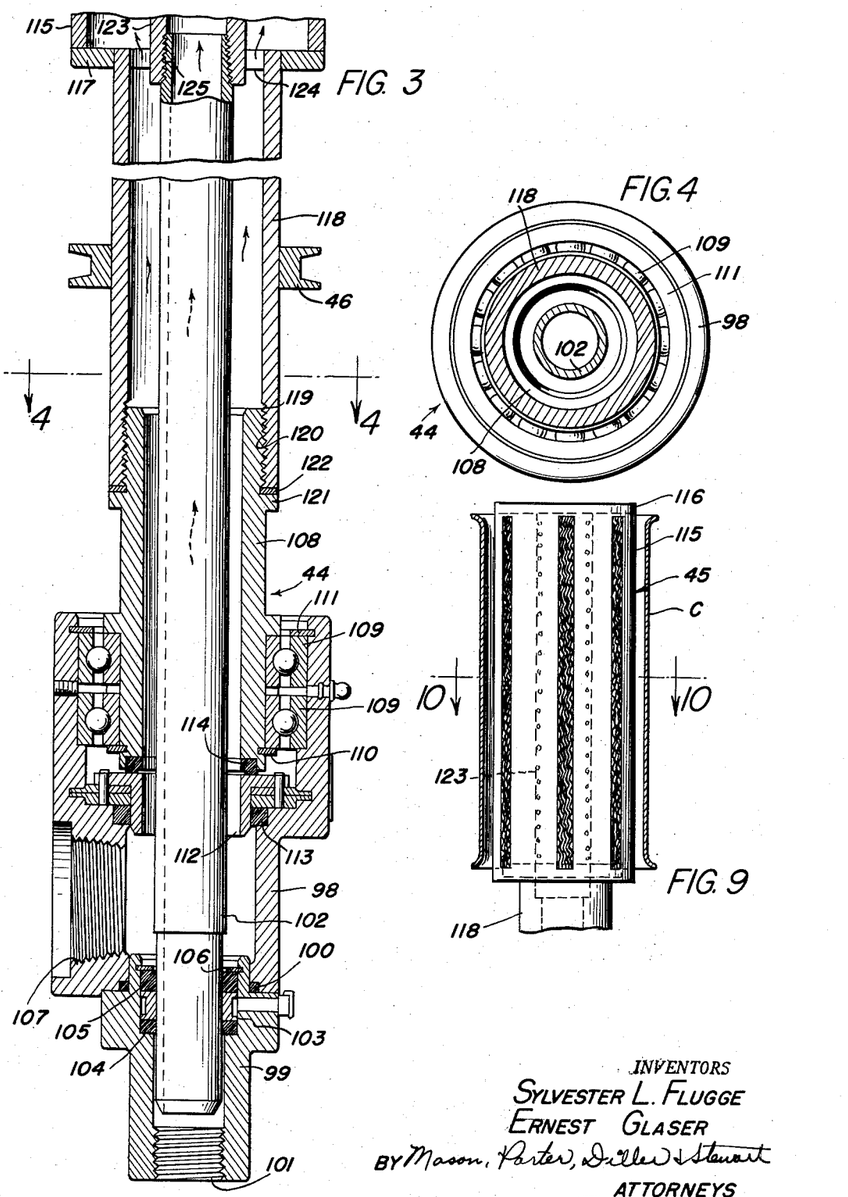
FIGURE 3 is an enlarged fragmentary vertical sectional view taken through a rotating union for one of the burners of the flame curing machine, and shows the connection between the rotating union and the burner.
FIGURE 4 is an enlarged transverse sectional view, taken along the section line 4—4 of FIGURE 3, and shows the specific cross-section of the coupling between the burner and the rotating union.
FIGURE 9 is a fragmentary elevational view of a fifth form of burner, and shows the relationship of a can being flame cured with respect to the burner, portions of the supply pipes of the burner being broken away.

In the operation of the flame curing machine 5, it is intended that as the turret 15 rotates, the support arms 24 will move downwardly carrying a can body C therewith into telescoping relation with a respective one of the burners 45. After the can body C has been fully telescoped over the burner 45, as is best shown in FIGURE 9, it is then desired to ignite the burner 45 and to subject the coated interior of the can body C to the open flame from the burner 45 to flame cure the coating. After a short cycle of flame curing, it is then desired to cool the can body C to prevent the deterioration of the tin or lithograph coating on the exterior of the can body. To this end, there are provided various controls for the individual burners 45.

In the first place, in order to assure the even distribution of the flame within the can body C during the flame curing operation, each of the burners 45 is rotated, the rotation of the individual burner 45 being accomplished through a pulley 46 secured thereto. The individual pulleys 46 lie in a common horizontal plane and are driven by an electric motor 47 through a drive pulley 48 and a drive belt 49. The electric motor 47 is mounted on a bracket 50 which, in turn, is supported by one of the support arms 43. Also mounted on the bracket 50 is an idler shaft 51 of a direction reversing pulley 52. Thus, the individual burners 45 will be rotated about their individual axes as the turret 15 rotates during a flame curing operation.

As was previously stated, the shaft 14 is tubular. The shaft 14 is divided into an upper compartment 53, and a lower compartment 54 by an intermediate plug 55. The upper end of the shaft 14 is closed by a fitting 56 to which a fuel supply line 57, preferably for a gaseous fuel, is connected for the purpose of supplying fuel to the upper chamber 53. A second fitting 58 closes the lower end of the shaft 14. A compressed air supply line 59 is connected to the fitting 58 for the purpose of supplying compressed air to the lower compartment 54.

The compressed air supply line 59 is illustrated as being supported by a hanger 60 secured to the underside of the base plate 7. At this time, it is pointed out that the fittings 56 and 58 are in the form of unions to permit the rotation of the shaft 14 while the stationary fuel supply line 57 and compressed air supply line 59 are coupled thereto.

At this time, it is pointed out that depending upon the particular construction of the burner 45, the relative positions of the fuel supply line 57 and the compressed air supply line 59 may be reversed. In other words, the upper compartment 53 may, under certain circumstances, be the compressed air compartment, and the lower compartment 54 be the fuel compartment.

A fuel pipe 61 for each of the rotating unions 44 extends outwardly from the shaft 14. The fuel pipes 61 are connected to the shaft 14 above the plug 55, and the interiors thereof are communicated with the interior of the upper compartment 53. An air pipe 62 for each of the rotating unions 44 is also secured to the shaft 14. However, the air pipes 62 are secured to the shaft 14 below the plug 55, and the interiors thereof communicate with the lower compartment 54. The fuel pipe 61 is connected to its respective rotating union 44 by a fitting 63. A second fitting 64 connects the air pipe to its respective rotating union 44.

Each fuel pipe 61 is provided intermediate its ends with a valve 65 which is controlled by an actuator 66 including a cam follower 67. An upstanding cam 68 is supported by the base plate 7 in alignment with the path of travel of the cam follower 67. The cam 68 may be removably secured to the base plate 7 in any desired manner to facilitate the replacement thereof. In this manner, the period of operation of the valve 65 and the location of this period of operation during the cycle operation of the turret 15 may be controlled and varied.

The air pipe 62 is also provided with a valve 69 which includes an actuator 70 and a cam follower 71. The cam follower 71 is engaged by a cam 72 which is disposed along the path of travel of the cam follower 71. It is to be noted that the cam 72 is not illustrated as being co-extensive with the cam 68. However, depending upon the particular requirements of the burner 45, the cams 68 and 72 may overlap.

In each cycle of operation, the fuel valve 65 and the air valve 69 are opened in the required sequence as the turret 15 rotates. The normal position of these valves are closed positions, and, accordingly, it is necessary that each burner 45 be ignited during the cycle of operation. To this end, a spark type igniter, generally referred to by the numeral 73, is provided. The igniter 73 includes a spark ignition coil 74 which has a primary winding 75 and a secondary winding 76. One end of the secondary winding 76 is grounded, as at 77, and the opposite end thereof is connected to a rub rail 78 which is supported in insulated relation from the frame 6 by an upstanding support 79 secured to the base plate 7. The flame curing machine 5 is grounded, as at 77; and thus the burner 45 forms one terminal of the secondary circuit. A second terminal 80 is spaced from the burner 45 and is supported in insulated relation by an upstanding support 81 which may be suitably secured to the associated union 44 or other parts of the individual burner structure. The terminal 80 has a contact 82 which bears against the rub rail 78 to complete the circuit between the terminal 80 and the secondary winding 76.

The primary winding 75 is directly connected to a power source by a wire 83 and indirectly by a wire 84, the wires 83 and 84 being connected to opposite ends of the primary winding 75. The wires 83 and 84 are connected to power lines 85 and 86 by a double-pole, single-throw switch 87. It is to be understood that the switch 87 is a master control switch.

An ignition control switch 88 is mounted in the wire 84. The switch 88 has an operator 89 which includes a cam follower 90. The cam follower 90 is engaged by a cam 91 which is supported from each of the support arms 43 by a depending hanger 92.

Considering the can holder 26 in detail, it will be seen that it is upright and channel-shaped in cross-section (FIGURE 2). The can holder 26 includes an upstanding web 93 which is secured to the outer end of its respective support arm 24. A plurality of fingers 94 is secured to the upper and lower ends of the web 93. As is best shown in FIGURE 1, the fingers 94 at each end of the web 93 are three in number, and are arranged in an E pattern.

The can holder 26 is of the magnetic type, and includes a magnet 97.

Reference is now made to FIGURE 3, wherein the details of the rotating union 44 are best illustrated. The rotating union 44 includes a tubular body 98 which is secured to the respective support arm 43 for supporting the rotating union 44 in an upright position. A fitting 99 projects from the lower end of the body 98 and is sealed thereto by a sealing ring 100. The fitting 99 is of a tubular construction and is provided with an internally threaded bore 101 which opens through the lower end thereof, the bore 101 receiving the fitting 64.

A pipe 102 is rotatably journaled with respect to the body 98 and the fitting 99 through a bearing 103 which is suitably supported within the fitting 99. Although the pipe 102 is rotatable with respect to the fitting 99, it is sealed relative to the fitting 99 by a pair of seals 104 and 105, the seals 104 and 105 being disposed on opposite sides of the bearing 103. The bearing 103 and the seals 104 and 105 are retained in place in the fitting 99 by a lock ring 106. It is to be noted that the pipe 102 is of a considerable length.

The body 98 is provided with an internally threaded bore 107 which extends transversely of the axis of the body 98. It is in this bore 107 that the fitting 63 is threaded.

A second pipe 108 is rotatably journaled in the body 98 by means of bearings 109. The pipe 108 is locked to the bearings 109 by a lock ring 110 and the bearings 109 are locked in the body 98 by a lock ring 111.

A seal unit 112 is mounted in the body 98 and is sealed relative thereto by a sealing ring 113. The seal unit 112 includes a second sealing ring 114 which bears against the end of the pipe 108 and forms a seal therewith. In this manner, the pipe 108 is sealed with respect to the housing 98 although it is free to rotate relative thereto.

The burner 45 includes a tubular body 115 which has the upper end thereof closed by an end wall 116. The lower end of the body 115 is closed by a lower end wall 117 which is annular in outline. An elongated outer pipe 118 has the upper end thereof recessed within the end wall 117 and is suitably secured thereto. The lower end of the pipe 118 is internally threaded, as at 119, and is threadedly engaged with an externally threaded upper portion 120 of the pipe 108. The pipe 108 also includes an outwardly projecting collar 121 against which a packing ring 122 bears, the packing ring 122 being clamped between the lower end of the pipe 118 and the collar 121 to form a seal between the pipes 108 and 118.

A tube 123 extends through the body 115 and has the upper end thereof secured to the end wall 116. The lower end of the tube 123 projects downwardly below the end wall 117 and is centered with respect to the pipe 118 by a spider 124. The lower end of the tube 123 is internally threaded and there is a threaded connection, as at 125, between the pipe 102 and the tube 123. In this manner, the burner 45 is coupled to the rotating union 44 so that fluid, such as air, entering into the fitting 99 passes through the pipe 102 and into the tube 123, whereas fluid, such as a combustible gas, entering into the body 98 passes through the pipe 108 and enters into the burner 45 through the pipe 118. It is to be noted that the pulley 46 for the burner 45 is mounted on a lower part of the pipe 118.

Figures 5, 6, 7, 8, 10:
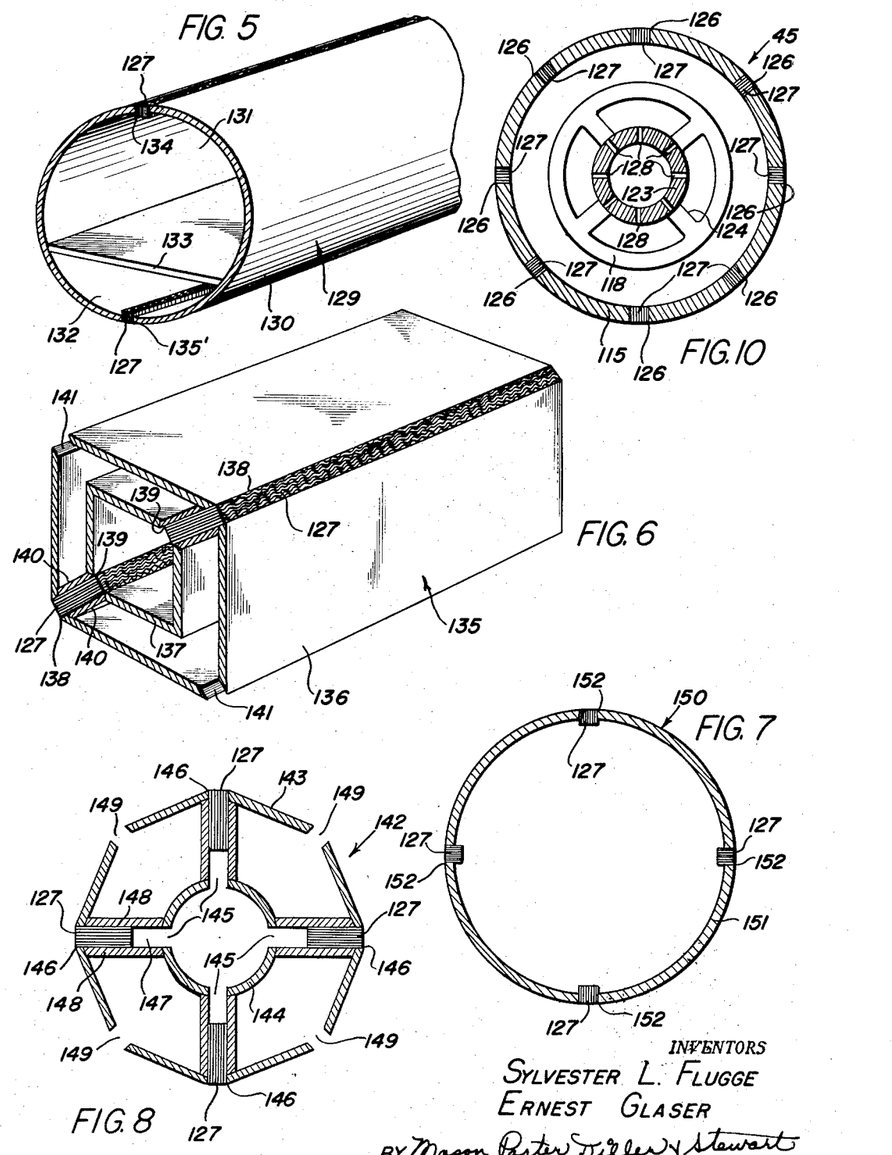
FIGURE 5 is an enlarged fragmentary perspective view of a portion of one of the burners for the flame curing machine, and shows the specific details of construction thereof.
FIGURE 6 is an enlarged fragmentary perspective view of a portion of another form of burner for the flame curing machine, and shows the details thereof.
FIGURE 7 is an enlarged transverse sectional view, taken through still another form of burner, wherein the fuel and air are supplied to a single chamber.
FIGURE 8 is an enlarged transverse sectional view taken through a fourth form of burner, and shows the specific compartmentation thereof.
FIGURE 10 is an enlarged transverse sectional view taken through the burner of FIGURE 9, along the section line 10—10 thereof, and shows the specific details of the burner of FIGURE 9.

Referring now to FIGURE 10 in particular, it will be seen that the body 115 of the burner 45 is provided with a plurality of circumferentially spaced discharge openings 126. Each of these discharge openings 126 is in the form of an elongated slot, as is best illustrated in FIGURE 9. A ribbon burner strip 127 is disposed in each of the discharge openings 126 for directing the flame of the burner 45 outwardly radial to the body 115.

It is to be understood that the gaseous fuel delivered to the burner 45 will flow into the body 115 around the tube 123. This gaseous fuel freely flows through the ribbon burner strips 127 and is ignited exteriorly of the body 115. On the other hand, compressed air is delivered into the interior of the burner 45 through the tube 123. The compressed air is discharged from the tube 123 through a plurality of perforations 128, the perforations 128 being disposed in longitudinally extending rows and being radially aligned with the discharge openings 126 so that compressed air discharging under pressure from the tube 123 will be directed to and through the discharge opening 126 with the flow of the compressed air being controlled by the ribbon burner strips 127.

A modified form of burner is illustrted in FIGURE 5, the burner being referred to in general by the reference numeral 129. The burner 129 includes a tubular body 130 which will be closed at its upper end and which will be provided at its lower end with suitable connections for connecting it to the rotating union 44. The tubular body 130 is divided into a fuel compartment 131 and a compressed air compartment 132 by a longitudinal divider strip 133.

An elongated slot-like discharge opening 134 is provided for the fuel compartment 131, and a similar slot-type discharge opening 135' is provided for the compressed air compartment 132. Ribbon burner strips 127 are disposed in the discharge openings 134 and 135'. At this time, it is pointed out that although the discharge opening 135' is for compressed air, the ribbon burner strip 127 will also function equally as well for directing the fresh air radially from the burner 129 against the interior surface of the can body C being flame cured.

Another form of burner, generally referred to by the numeral 135, is illustrated in FIGURE 6. The burner 135 includes a body 136 which is square or rectangular in cross-section. A similar cross-sectional tube 137 is disposed within the body 136 in coaxial relation. The upper end of the body 136 will be closed by an end wall (not shown) which will also center the tube 137. The body 136 and the tube 137 will be provided with suitable fittings, similar to those of burner 45, for connecting the burner 135 to the rotating union 44. However, in this particular form of burner, the tube 137 defines the fuel chamber, whereas the space intermediate the tube 137 and the body 136 defines the compressed air chamber.

The body 136 is provided at diagonally opposite first corners thereof with discharge openings 138. The discharge openings 138 are aligned with discharge openings 139 at diagonally opposite corners of the tube 137. Spaced parallel plates 140 extend between the tube 137 on opposite sides of the aligned discharge openings 138 and 139. Ribbon burner strips 127 are disposed in the discharge openings 138 for controlling the flow of fuel from the burner 135.

The body 136 of the burner 135 is also provided with discharge openings 141 at second diagonally opposite corners thereof. The discharge openings 141 open directly into the chamber between the tube 137 and the body 136 and permit the radial flow of compressed air out of th ebody 136 onto the interior surface of a can body which has been flame cured.

In FIGURE 8, still another form of burner is illustrated, the burner being referred to by the numeral 142. It is to be noted that the burner 142 includes a body 143 which is octagonal in outline. A circular tube 144 extends coaxial with the body 143 and will be secured thereto in spaced relation in the manner described above with respect to the components of the burner 135.

Like the burner 135, the burner 142 is constructed so that the gaseous fuel will flow through the tube 144, whereas the compressed air will flow through the spaces disposed between the tube 144 and the body 143.

The tube 144 is provided with a plurality of elongated, circumferentially spaced discharge openings 145. The discharge openings 145 are aligned with longitudinally extending slot-type discharge openings 146 in the body 143. The individual pairs of discharge openings 145 and 146 are communicated with each other by passages 147 defined by pairs of plates 148 which extend between the tube 144 and the body 143 at the edges of the discharge openings 145 and 146. Ribbon burner strips 127 are disposed in the outer parts of the passages 127 and within the discharge openings 146.

The body 143 is provided with additional discharge openings 149 intermediate the discharge openings 146. The discharge openings 149 open directly into the compressed air chamber defined by the tube 144 and the body 143, and the compressed air flows radially outwardly therethrough.

A simplified form of burner is illustrated in FIGURE 7, and is referred to by the reference numeral 150. The burner 150 is formed primarily of a tubular body 151 which is provided with a plurality of elongated slot-type discharge openings 152 which are circumferentially spaced. A ribbon burner strip 127 is disposed in each of the discharge openings 152 for distributing fuel and air radially from the body 151. Although the burner 150 may be used with the rotating union 44 which has separate pipes for the fuel and the air, the fuel and air will be admitted into the single chamber defined by the body 151. When utilizing the burner 150, it is not necessary to utilize a complicated double pipe union of the type illustrated in figure, but a simple single pipe rotating union may suffice. If such a union is utilized, it will be necessary that the fuel pipe 61 and the air pipe 62 open into a manifold which will be connected to the rotating union.

Figure 11:
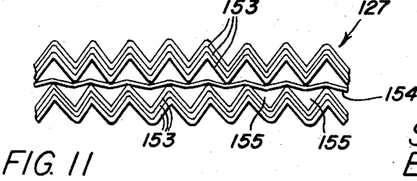
FIGURE 11 is an enlarged fragmentary plan view of a portion of one of the ribbon strip burners placed in the discharge openings of the burners.

Reference is now made to FIGURE 11, wherein the details of one of the ribbon burner strips 127 are illustrated. Each ribbon burner strip 127 is formed of a plurality of internested corrugated strips 153, and one or more spacer strips 154. In the form of ribbon burner strip illustrated in FIGURE 11, the spacer strip 154 is provided with shallow corrugations to facilitate the accurate positioning of the corrugated strips 153. It is to be noted that the positioning of the spacer strips 154 intermediate a pair of the corrugated strips 153 results in the formation of a plurality of flow passages 155 through which the fuel or compressed air, as the case may be, may flow under directional and volume control. By varying the number of spacer strips 154 or the depth of corrugations thereof, it will be readily apparent that the total volume of a given ribbon burner strip area may be varied.

Figure 13:
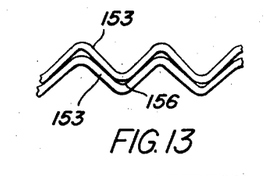
FIGURE 13 is an enlarged fragmentary plan view, showing the relationship between two strips of one of the ribbon strip burners of FIGURES 11 and 12, and shows the spacing therebetween to provide secondary flow passages.

Attention is also directed to FIGURE 13 wherein the details of the individual corrugated strips 153 are clearly shown. It is to be understood that in the formation of the corrugated strips 153, the corners thereof will not be perfectly square, but will be rounded to define secondary flow passages 156. These secondary flow passages will also include any variation in the flat surfaces of the corrugations.

Figure 12:
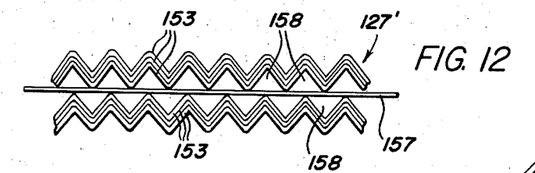
FIGURE 12 is a fragmentary plan view of a second form of ribbon strip burner, and shows the specific details thereof.

A modified form of ribbon burner strip 127' is illustrated in FIGURE 12. The ribbon burner strip 127' is very similar to the ribbon burner strip 127 and includes a plurality of the corrugated strips 153. The corrugated strips 153 for the most part are nested, but are separated at intervals by a spacer strip 157. The spacer strip 157, unlike the spacer strip 154, is flat. The spacer strip 157 eliminates all problems of orienting the corrugated strips 153 with respect to each other, in groups, and with respect to the spacer strip 157. Of course, primary flow passages 158 will be formed intermediate the spacer strip 157 and the corrugated strips 153. In addition to this, there will be the secondary flow passages 156 of FIGURE 13.

Operation

In the operation of the flame curing machine 5, a continuous line of can bodies C which have been interiorly coated will be supplied to the infeed turret 31. As the turret 15 rotates, the individual can holders 26 will pass the infeed turret 31 in timed relation and will receive can bodies C as they are stripped from the infeed turret 31 by the stripper plate 37. After the can holder 26 receives its respective can body C, the support arm 24 for the particular can holder 26 will be moved downwardly due to the shape of the cam track 28. The burner 45, or other burner which may replace burner 45, moving together with the can holder 26 as parts of the turret 15, will receive the can body C in telescoped relation, in the manner best illustrated in FIGURE 9. It is desired that the can body C be fully telescoped over the burner 45 prior to the ignition of the fuel so that the can body will be cured equally from top to bottom. To this end, the cam 68 is designed so that the valve 65 for the fuel is opened slightly in advance of the full telescoped position of the can body C with respect to the burner 45. Then, as the turret 15 rotates and the can body C reaches its full telescoped position of FIGURE 9, the switch 88, which will be accurately positioned, will be closed to complete the circuit to the spark coil 74, thus operating the igniter 73 to ignite the fuel from the burner 45.

The flame curing of the coating on the interior of the can must be controlled so as to prevent the deterioration of the can, for example, the tin coating on the can or the lithograph coating thereof. The gas-on time will be controlled by the length of the cam 68. As stated above, the cam 68 may be replaced, depending upon the particular flame curing operation.

As the turret 15 rotates and the end of the gas-on time is reached, the cam follower 67 will ride off the cam 68 and the valve 65 will again close, thus discontinuing the flow of fuel to the burner 45. Simultaneous with the discontinuance of the flow of fuel to the burner 45, the cam follower 71 will ride up on the cam 72 and open the valve 69 so that compressed air will be delivered to the burner 45. The compressed air will be directed onto the interior of the can body C, and thus rapidly cool the can body to prevent the heat carried by the can body from damaging the coating thereof.

As the turret 15 continues to rotate, the flame cured can body C is cooled to sufficiently set the tin coatings and enamels thereof by the flow of compressed air into the interior thereof. Thus, when the can body C strikes the stripper member 40, there will be no damage to the exterior coating thereof. Incidentally, it is pointed out that the can body rides primarily on a bottom support as it passes through the outfeed turret 32.

At this time, it is pointed out that the effect of the individual burners can be controlled not only by the length of gas-on time. Depending upon conditions, the volume of fuel flowing from the burner will be controlled, thus controlling the heat of the flame. This may be accomplished by varying the length and size of flow openings in the ribbon burner strips, as well as the number of ribbon burner strips, and/or varying the pressure of the fuel being supplied. The volume of cooling air may be controlled by the same methods. Secondly, the compressed air may have a function other than the cooling of the flame cured can body. If desired, the air can be ejected into the can before the gas is turned on in order to supply air for combustion. Also, when conditions dictate, the air can be ejected into the can bodies simultaneously with the gas or fuel to vary the flame curing operation.

From the foregoing, it will be seen that novel and advantageous provision has been made for carrying out the desired end. However, attention is again directed to the fact that variations may be made in the example method and apparatus disclosed herein without departing from the spirit and scope of the invention, as defined in the appended claims.

We claim:

1. An apparatus for flame curing the coated interior surface of a can body, said apparatus comprising a turret, drive means connected to said turret for rotating said turret, said turret including a plurality of burner supports, a generally vertically disposed burner assembly carried by each of said burner supports, means connected to each of said burner assemblies for rotating said burner assemblies, a plurality of can body supports connected to said turret for rotation therewith, there being one can body support for each of said burner supports, a can body holder carried by each of said can body supports for supporting a can body in vertical alignment with a respective one of said burner assemblies, and means connected to said can body supports for vertically reciprocating said can body holders toward and away from said burner assemblies as said turret rotates, to telescope can bodies to be cured over said burner assemblies.

2. The apparatus of claim 1 wherein said burner assembly includes a burner, a fuel supply line connected to said burner, a fuel flow control valve incorporated in said fuel supply line, means operable in response to rotation of said turret and connected to said turret and said fuel flow control valve for admitting fuel to a respective burner through a limited arc of rotation of said burner, and igniter means of the spark ignition type for igniting said fuel as said burner passes a predetermined position along the path of travel of said burner.

3. An apparatus for flame curing the coated interior surface of a can body, said apparatus comprising a turret, drive means connected to said turret for rotating said turret, said turret including a plurality of burner supports, a generally vertically disposed burner assembly carried by each of said burner supports, each burner assembly including a union having a first portion fixedly secured to a respective one of said burner supports for movement therewith and a second portion connected to said first portion for movement therewith and for rotation relative thereto, a fuel line connected to said union, a burner supported by said union for rotation with fuel being supplied to said burner through said union, and means connected to said burner for rotating said burner, a plurality of can body supports connected to said turret for rotation therewith, there being one can body support for each of said burner supports, a can body holder carried by each of said can body supports for supporting a can body in vertical alignment with a respective one of said burner assemblies, and means connected to said can body supports for vertically reciprocating said can body holders toward and away from said burner assemblies as said turret rotates to telescope can bodies to be cured over said burner assemblies.

4. The apparatus of claim 3 wherein said fuel line includes a fuel flow control valve, and means operable in response to rotation of said turret and connected to said turret and said fuel flow control valve for admitting fuel to a respective burner through a limited arc of rotation of said turret.

5. The apparatus of claim 3 wherein said fuel line includes a fuel flow control valve, means operable in response to rotation of said turret and connected to said turret and said fuel flow control valve for admitting fuel to a respective burner through a limited arc of rotation of said turret, and igniter means for igniting said fuel as said burner passes a predetermined position along the path of said burner.

6. The apparatus of claim 3 wherein said fuel line includes a fuel flow control valve, means operable in response to rotation of said turret and connected to said turret and said fuel flow control valve for admitting fuel to a respective burner through a limited arc of rotation of said turret, and igniter means for igniting said fuel as said burner passes a predetermined position along the path of said burner, said igniter being of the spark ignition type and including a stationary power supply.

7. The apparatus of claim 3 wherein said fuel line includes a fuel flow control valve, means operable in response to rotation of said turret and connected to said turret and said fuel flow control valve for admitting fuel to a respective burner through a limited arc of rotation of said turret, and igniter means for igniting said fuel as said burner passes a predetermined position along the path of said burner, said igniter means being of the spark ignition type and including one terminal spaced from said burner, said burner being the other terminal.

8. The apparatus of claim 3 wherein said fuel line includes a fuel flow control valve, means operable in response to rotation of said turret and connected to said turret and said fuel flow control valve for admitting fuel to a respective burner through a limited arc of rotation of said turret, and an igniter for igniting said fuel as said burner passes a predetermined position along the path of said burner, said igniter being of the spark ignition type and including a stationary power supply, a wiper connection between said power supply and said igniter, and a turret controlled switch for momentarily energizing said igniter.

9. An apparatus for flame curing the coated interior surface of a can body, said apparatus comprising a turret, drive means connected to said turret for rotating said turret, said turret including a plurality of burner supports, a generally vertically disposed burner assembly carried by each of said burner supports, each burner assembly including a burner, means connected to each of said burners for rotating said burners, a fuel supply line and an air supply line individually connected to said burner for first producing a curing flame and then providing cooling air, and separate flow control valve assemblies incorporated in said fuel supply line and said air supply line for controlling flow therethrough, a plurality of can body supports connected to said turret for rotation therewith, there being one can body support for each of said burner supports, a can body holder carried by each of said can body supports for supporting a can body in vertical alignment with a respective one of said burner assemblies, and means connected to said can body supports for vertically reciprocating said can body holders toward and away from said burner assemblies as said turret rotates to telescope can bodies to be cured over said burner assemblies.

10. The apparatus of claim 9 wherein said flow control valve assemblies are mounted on said turret for rotation therewith, separate cams are mounted beneath said turret in alignment with the paths of movement of said flow control valve assemblies, and each flow control valve assembly has an operator including a follower engageable with a respective one of said cams for controlling the opening and closing of individual ones of said flow valve assemblies.

11. The apparatus of claim 9 wherein said burner has separate fuel and air chambers and separate fuel and air outlets.

12. The apparatus of claim 9 wherein said burner has separate fuel and air chambers and separate fuel and air outlets, said fuel and air chambers being coaxial.

13. An apparatus of claim 9 wherein each burner is supported for rotation by a rotating union and said fuel and air supply lines are connected to said burner through said union.

14. The apparatus of claim 9 wherein each burner has ribbon burner strips for controlling the flow of fuel therefrom.

15. The apparatus of claim 9 wherein said turret has a tubular shaft provided within an intermediate interior divider, a main fuel line connected to one end of said shaft and a main air line connected to the other end of said shaft, and said fuel supply lines and said air supply lines being connected to respective portions of said shaft for receiving fuel and air therefrom.

16. The apparatus of claim 9 wherein said burner includes a tubular body having a plurality of elongated longitudinally extending peripherally spaced discharge openings, divider means within said tubular body dividing said body into separate fuel and air chambers, and separate fuel and air fittings connected to said tubular body and opening into said fuel and air chambers.

17. An apparatus for flame curing the coated interior surface of a can body, said apparatus comprising a turret, drive means connected to said turret for rotating said turret, said turret including a plurality of burner supports, a generally vertically disposed burner assembly carried by each of said burner supports, each burner assembly including a burner, means connected to each of said burners for rotating said burners, a fuel line and an air line individually connected to said burner for first producing a curing flame and then providing cooling air, and separate flow control valve assemblies incorporated in said fuel line and said air line for controlling flow therethrough, a plurality of can body supports connected to said turret for rotation therewith, there being one can body support for each of said burner supports, a can body holder carried by each of said can body supports for supporting a can body in vertical alignment with a respective one of said burner assemblies, means connected to said can body supports for vertically reciprocating said can body holders toward and away from said burner assemblies as said turret rotates to telescope can bodies to be cured over said burner assemblies, and igniter means for igniting said fuel as said burner passes a predetermined position along the path of said burner.

18. A method of curing an interior coating on a can body comprising the steps of placing a rotating flame within the can body to evenly cure the coating, extinguishing the flame and immediately cooling the can by injecting cooling air into the interior thereof at the time the flame is extinguished.

19. A method of curing an interior coating on a can body comprising the steps of placing a rotating burner in telescoped relation within a can body and flame curing the coating, extinguishing the flame and immediately ejecting cooling air into the can body from the burner to cool the can body at the time the flame is extinguished.

20. A method of flame curing an interior coating on a can body utilizing a rotating burner comprising the steps of telescoping a can body and the burner, igniting said burner after the burner is fully within the can body and flame curing the coating, extinguishing the flame and immediately cooling the can body by ejecting cooling air into the can body from the burner at the time the flame is extinguished.

References Cited in the file of this patent

UNITED STATES PATENTS

| | | |
|---|---|---|
| 2,094,731 | Bryon | Oct. 5, 1937 |
| 2,140,841 | Leonard et al. | Dec. 20, 1938 |
| 2,194,433 | Schorck | Mar. 19, 1940 |
| 2,262,960 | Osterman | Nov. 18, 1941 |
| 2,429,407 | Durst | Oct. 21, 1947 |
| 2,443,101 | Flynn et al. | June 18, 1948 |
| 2,534,547 | Eisler | Dec. 19, 1950 |
| 2,613,480 | Morgan | Oct. 14, 1952 |
| 2,648,166 | Fisher et al. | Aug. 11, 1953 |
| 2,848,819 | Schoenfeld | Aug. 26, 1958 |
| 2,869,632 | Bornkessel | Jan. 20, 1959 |
| 2,892,733 | Gardner et al. | June 30, 1959 |